April 24, 1928.  1,667,584
M. J. CHAPLIN
LOCKING DEVICE FOR AUTOMOBILES
Filed March 11, 1927   2 Sheets-Sheet 1
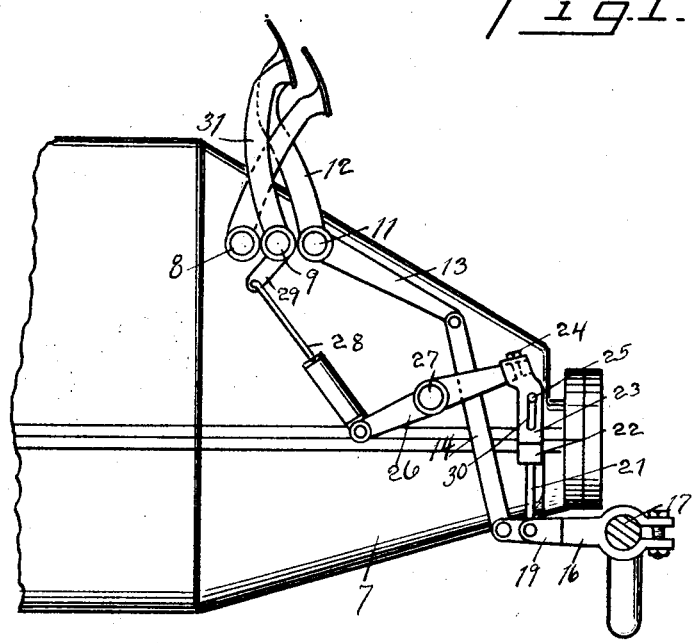
Fig. I.
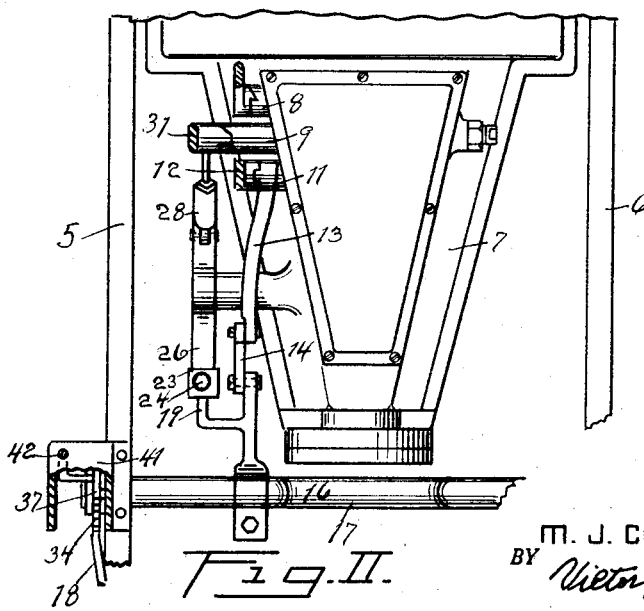
Fig. II.
INVENTOR.
M. J. CHAPLIN
BY Victor J Evans
ATTORNEY.

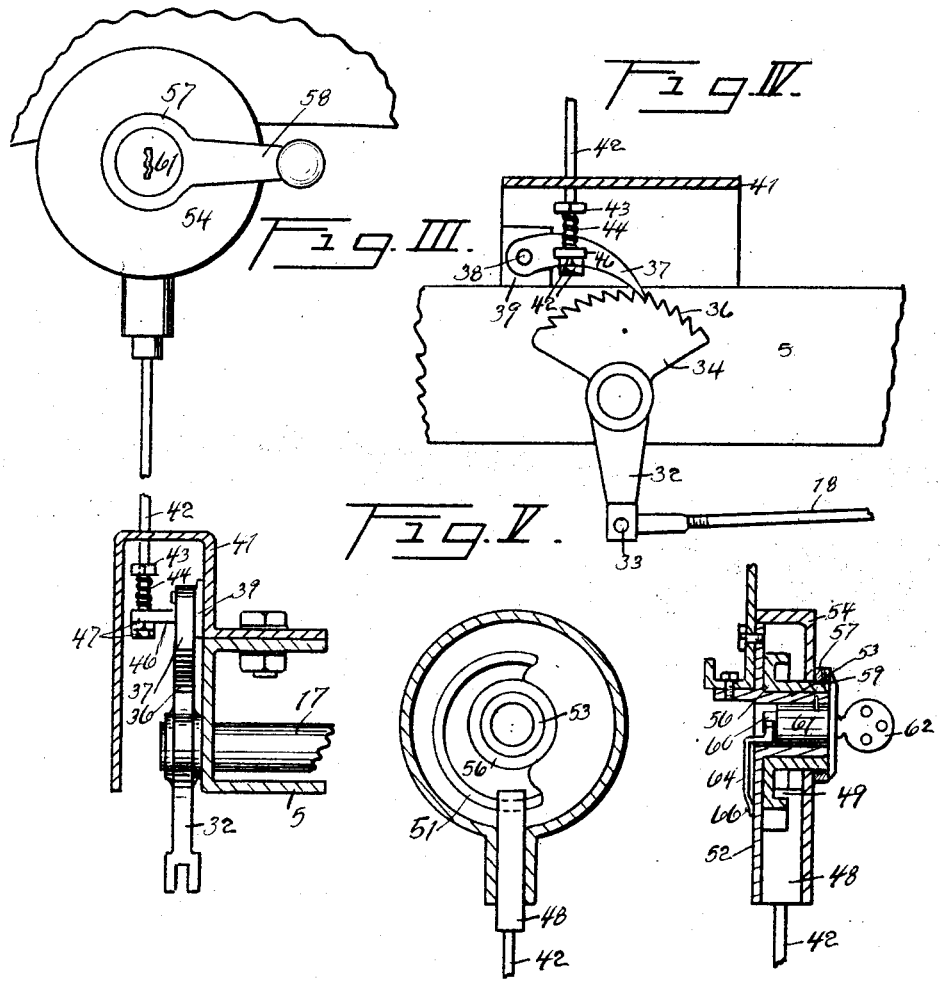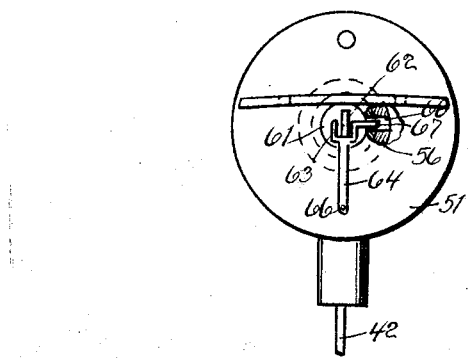

Patented Apr. 24, 1928.

1,667,584

UNITED STATES PATENT OFFICE.

MANLEY J. CHAPLIN, OF BERKELEY, CALIFORNIA.

LOCKING DEVICE FOR AUTOMOBILES.

Application filed March 11, 1927. Serial No. 174,599.

This invention relates to improvements in locking devices for automobiles, and has particular reference to means for setting and locking the brakes of a motor vehicle.

Another object of this invention is to provide means whereby the transmission is held in neutral position when the brakes are applied or locked.

Another object is to provide means which may be attached to any automobile now upon the market without materially altering the construction of the same.

A further object is to produce a device of this character which may be readily attached to a motor vehicle thereby making an economical installation.

A still further object is to provide means whereby the locking mechanism cannot be easily tampered with.

Other objects and advantages will be apparent during the course of the following description.

In the accompanying drawings forming a part of this specification, and in which like numerals are employed to designate like parts throughout the same, Figure I is a side elevation of a transmission housing showing the pedal arrangement, Figure II is a top plan view of Figure I, Figure III is a front elevation of the locking lever and locking dog partly shown in cross-section, Figure IV is a fragmentary detail view showing the locking dog, Figure V is a vertical cross-section of the locking housing and cam, Figure VI is a vertical cross-section of the locking housing and locking mechanism taken at right angles to that of Figure V, and Figure VII is a rear elevation of the locking housing.

On motor vehicles of the Ford type a side lever is employed for the purpose of applying the emergency brakes, and at the same time this side lever when placed in neutral position also throws the gear mechanism to neutral position.

I have eliminated this side lever through a novel arrangement and have substituted therefor a locking mechanism which will accomplish the same purpose as the side lever and further will be capable of being locked.

In the accompanying drawings wherein for the purpose of illustration is shown a preferred embodiment of my invention, the numerals 5 and 6 refer to the chassis frame between which is positioned the customary gear housing 7. Extending through the gear housing are three parallel shafts 8, 9 and 11. These shafts serve to operate friction bands within the housing 7, the construction of which is well known to anyone familiar with the art.

The shaft 8 controls the reverse band, the shaft 9 the low speed band and the shaft 11 the brake band. With my invention I remove the brake band leaving the shaft free to rotate and not perform any function within the transmission housing.

To the brake pedal 12 I attach a lever 13 to which is pivoted a link 14 which extends downwardly and is connected to a lever 16 which is in turn clamped to a rocker bar 17. This rocker bar extends between the chassis frames 5 and 6 and is journaled therein. This rocker bar serves to operate the customary emergency brakes of the motor vehicle through the medium of brake rods one of which is shown at 18, in Figure IV.

The lever 16 has an offset arm 19 to which is pivoted a rod 21 having a squared head 22 positioned within the bifurcated end of a fitting 23. This fitting is secured by a bolt 24 to a rocker arm 26 mounted upon a shaft 27. This shaft extends into the transmission housing and operates the customary clutch.

An adjustable link 28 connects the opposite end of the rocker arm to an extension 29 of the low speed pedal 31. Secured to the outer extremities of the rocker bar 17 are depending arms 32, one of which is shown in Figure IV, the lower extremity of which arms are bifurcated so as to have pivoted therein as at 33, the brake rods 18. Upon one of these arms, I form a segment 34 having a ratchet 36. This ratchet is in turn engaged by the nose of a dog 37 pivoted as at 38 to a brace 39 attached to the frame 5.

A cover plate is shown at 41 and serves to position the lower extremity of a locking rod 42. This rod carries a nut 43 against which a spring 44 abuts. The lower extremity of this spring contacts a lug 46 secured to the dog 37.

Lock nuts 47 serve to retain the rod in engagement with the lug 46. The upper extremity of this rod has secured thereto a squared head 48 having a nose 49 which engages a cam 51. This cam is positioned within a housing comprising a back plate 52 upon which is formed a hub 53. This hub serves to position the cam 51.

A cover plate is shown at 54 and has an opening therein through which the hub 53 as well as the hub 56 of the cam extends.

The hub of the cam is screw-threaded so as to have positioned thereon the ring 57 of the pivoted handle 58. This handle is held to the hub against rotation by a pin 59. Positioned within the hub 53 is a lock 61 operated by a key 62. The cylinder of this lock is provided with a boss 60 which lies within a yoke 63 carried upon an offset lever 64 pivoted as at 66 to the back plate 52. A yoke 63 has an arm 67 which is adapted to be projected into an opening 68 formed into the cam hub 56.

The result of this construction is that when the lever 58 is rotated so as to throw the locking rod 42 downwardly, pressure is exerted upon the spring 44, which pressure is transmitted to the dog 37, therefore if the brake pedal is depressed, motion will be transmitted so as to cause the rocker bar 17 to move thereby tightening the brakes by pulling upon the brake rods 18. As this happens, the ratchet teeth 36 passing beneath the nose of the dog 37 will prevent retrograde movement of the rocker bar. At the same time upward movement of the rod 21 will cause a rocking action of the rocker bar 26 thereby rotating the shaft 27, releasing the clutch and through the action of the adjustable link 38 it will move the pedal 31 to neutral position.

If the key 62 is now inserted in the lock and rotated the boss 60 will cause the yoke 63 to move so as to project the hub 67 into the opening 68 which will prevent rotation of the hub 56 in the cam 51, thus locking the machine against movement.

When the lever 58 is moved to unlocked position, the result will be that the dog 37 will be raised thereby moving the nose out of the path of movement of the ratchet teeth 36 after which the vehicle may be operated.

In pressing upon the low speed pedal 31, the brakes will not be actuated through the fact that the pin 25 is at the lower end of the slot 30 and consequently the fitting 23 will merely slide downwardly upon the squared head 22, of the rod 21.

When it is desired to stop the motor vehicle without locking the same, pressure upon the brake pedal will perform the function above set forth with the exception that the dog 37 will be out of operating position and consequently the only action taking place will be the braking and the throwing of the clutch into neutral position.

It will thus be seen that I have produced a device which will not only permit the car to be more easily operated in that one foot will control the braking action, and at the same time place the car in neutral position, but I have further provided means for locking the car in this condition when desired.

It is to be understood that the form of my invention herewith shown and described is to be taken as a preferred example of the same, and that various changes relative to the size, shape, material and arrangement of parts may be resorted to without departing from the spirit of the invention or the scope of the subjoined claims.

Having thus described my invention, I claim:—

1. In a motor vehicle, a rocker bar adapted to actuate the brakes of a motor vehicle, a lever secured to said rocker bar, means for connecting said lever to the brake pedal of said motor vehicle, a ratchet positioned on said rocker bar and means for locking said ratchet against retrograde movement.

2. The combination with a motor vehicle having a rocker bar adapted to actuate the brakes of said motor vehicle, of a ratchet secured to said rocker bar, a dog adapted to be moved into engagement with said ratchet, means for actuating said dog and for locking said last mentioned means for the purpose specified.

3. In a device of the character described, a rocker bar adapted to actuate the brakes of a motor vehicle, a lock housing remotely positioned with respect to said rocker bar, a cam positioned within said housing, a locking rod actuated by said cam, a lock positioned within said housing, for the purpose of locking said rod against movement, a dog capable of being moved by said rod, a ratchet in alignment with said dog and adapted to be contacted thereby, said ratchet being positioned upon said rocker bar.

4. In a device of the character described, a rocker bar adapted to actuate the brakes of a motor vehicle, a lock housing remotely positioned with respect to said rocker bar, a cam positioned within said housing, a locking rod actuated by said cam, a lock positioned within said housing, for the purpose of locking said rod against movement, a dog capable of being moved by said rod, a ratchet in alignment with said dog and adapted to be contacted thereby, said ratchet being positioned upon said rocker bar, a lever secured to said rocker bar and adapted to actuate the clutch mechanism of the vehicle upon which said device is positioned.

In testimony whereof I affix my signature.

MANLEY J. CHAPLIN.